(12) United States Patent
Ahn et al.

(10) Patent No.: US 8,530,077 B2
(45) Date of Patent: Sep. 10, 2013

(54) INSULATING CASE FOR SECONDARY BATTERY AND SECONDARY BATTERY HAVING THE SAME

(75) Inventors: Chang-Bum Ahn, Suwon-si (KR); Chan-Hee Lee, Suwon-si (KR); Ha-Dong Kim, Suwon-si (KR); Yun-Kyung Ha, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 500 days.

(21) Appl. No.: 12/617,907

(22) Filed: Nov. 13, 2009

(65) Prior Publication Data

US 2010/0136415 A1   Jun. 3, 2010

(30) Foreign Application Priority Data

Nov. 28, 2008   (KR) .................. 10-2008-0119823

(51) Int. Cl.
*H01M 2/08*   (2006.01)

(52) U.S. Cl.
USPC .............................. 429/175; 429/62; 429/163

(58) Field of Classification Search
USPC ........................................... 429/62, 163, 175
See application file for complete search history.

(56) References Cited

U.S. PATENT DOCUMENTS

| 2004/0091771 A1* | 5/2004 | Hosaka et al. | 429/185 |
| 2006/0251962 A1* | 11/2006 | Kim | 429/130 |

FOREIGN PATENT DOCUMENTS

| JP | 2005-149861 | | 6/2005 |
| JP | 2006-100097 | | 4/2006 |
| JP | 2007-154135 | | 6/2007 |
| JP | 2007154135 A | * | 6/2007 |
| JP | 2008-192414 | | 8/2008 |
| KR | 10-2004-0035411 | | 4/2004 |
| KR | 10-2004-0058922 | | 7/2004 |
| KR | 10-2006-0010662 | | 2/2006 |
| KR | 10-2006-0051749 | | 5/2006 |

OTHER PUBLICATIONS

KIPO Office action dated Jul. 26, 2010, for priority Korean Patent application 10-2008-0119823, noting listed references in this IDS.
Patent Abstracts of Japan and English machine translation for Japanese Publication 2005-149861 listed above.
Patent Abstracts of Japan and English machine translation for Japanese Publication 2007-154135 listed above.
Patent Abstracts of Japan and English machine translation for Japanese Publication 2008-192414 listed above.

* cited by examiner

*Primary Examiner* — Zachary Best
(74) *Attorney, Agent, or Firm* — Christie, Parker & Hale, LLP

(57) ABSTRACT

An insulating case for a secondary battery and a secondary battery having the same, the insulating case having opposing first and second portions. The first portion faces an electrode assembly of the secondary battery and has a first melting point. The second portion faces a cap assembly of the secondary battery and has a second melting point that is higher than the first melting point. The first melting point is approximately the contraction temperature of a separator of the electrode assembly.

23 Claims, 2 Drawing Sheets

INSULATING CASE FOR SECONDARY BATTERY AND SECONDARY BATTERY HAVING THE SAME

CROSS-REFERENCE TO RELATED APPLICATION

This application claims the benefit of Korean Patent Application No. 10-2008-0119823, filed Nov. 28, 2008, the disclosure of which is hereby incorporated herein by reference.

BACKGROUND OF THE INVENTION

1. Field of the Invention

Aspects of the present invention relate to an insulating case for a secondary battery and a secondary battery having the same.

2. Description of the Related Art

Secondary batteries can be repeatedly charged and discharged, and thus, they are more economical than disposable batteries. Moreover, because secondary batteries can realize a high capacity in a small volume, they are in wide use as power sources for portable electronic devices, such as cellular phones, notebook computers, camcorders, digital cameras, etc.

Secondary batteries include, for example, nickel-cadmium batteries, nickel-hydrogen batteries, nickel-zinc batteries, lithium ion secondary batteries, lithium polymer secondary batteries, etc. Lithium ion secondary batteries are widely used, because they can be fabricated at a small size, while having a high capacity, a high operating voltage, and a high energy density per unit weight.

Lithium ion secondary batteries may be classified as can-type and pouch-type, according to the shape of a case accommodating an electrode assembly. An electrode assembly generally includes a positive electrode plate, a negative electrode plate, and a separator. Can-type batteries may be classified as prismatic or cylindrical, according to the shape thereof.

The case of a prismatic lithium ion secondary battery is formed of a metal such as aluminum, and the corners thereof may be rounded. A prismatic lithium ion secondary battery is fabricated by inserting an electrode assembly and an electrolyte into a can, through an opening thereof, and then sealing the opening with a cap assembly. A prismatic lithium ion secondary battery includes an insulating case located at the top of the electrode assembly, so as to prevent the electrode assembly from moving, and to prevent a short circuit between the electrode assembly and the cap assembly.

If the internal temperature of the secondary battery reaches, for example, 110° C. to 130° C., the upper end of the separator contracts. As a result, the positive electrode plate and the negative electrode plate may be short-circuited, which may result in a fire or an explosion.

SUMMARY OF THE INVENTION

Aspects of the present invention provide an insulating case for a secondary battery, which can improve safety at high temperatures, by preventing a heat-related electrical short circuit, and a secondary battery having the same.

In one aspect, provided is a secondary battery having an insulating case. The secondary battery is generally formed by accommodating an electrode assembly in a can, and sealing an opening of the can with a cap assembly. The insulating case includes a first portion that faces the electrode assembly, and an opposing second portion. The first portion has a lower melting point than the second portion.

In another aspect, provided is a secondary battery including: an electrode assembly including a first electrode plate, a second electrode plate, and a separator interposed therebetween; a can including an opening at one side, to accommodate the electrode assembly; a cap assembly coupled to the opening of the can; and an insulating case including a first portion that faces the electrode assembly and an opposing second portion. At least the first portion of the insulating case has a melting point that is from about 90% to 110% of the temperature at which the separator contracts.

In still another aspect, the present invention provides a secondary battery including: an electrode assembly including a first electrode plate, a second electrode plate, and a separator interposed therebetween; a can including an opening, to accommodate the electrode assembly; a cap assembly coupled to the opening of the can; and an insulating case including a first portion that faces the electrode assembly and an opposing second portion. Here, the first portion has a lower melting point than the second portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
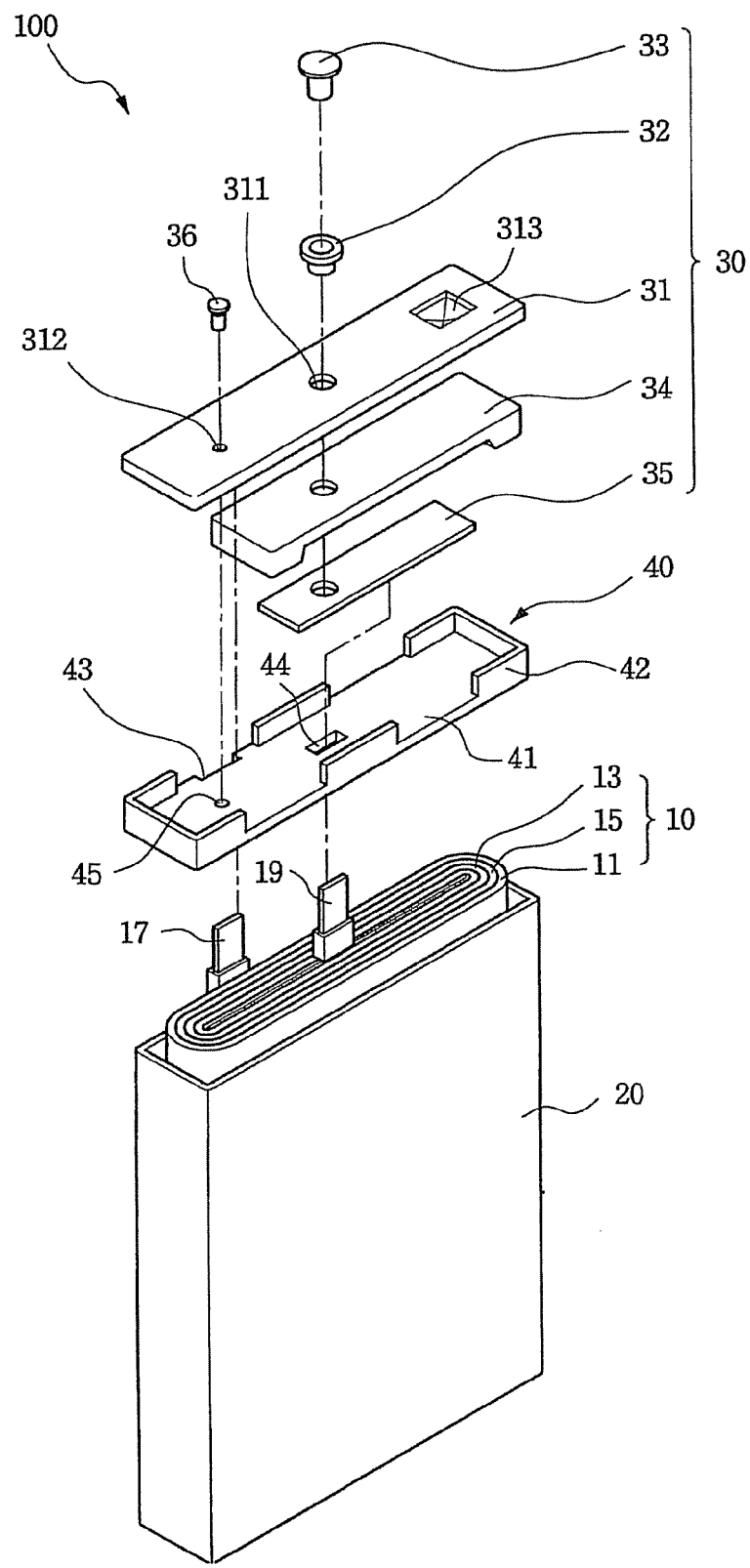
FIG. 1 is an exploded perspective view of a secondary battery, according to an exemplary embodiment of the present invention.

Reference will now be made in detail to the exemplary embodiments of the present invention, examples of which are shown in the accompanying drawings, wherein like reference numerals refer to like elements throughout. The exemplary embodiments are described below, with reference to the figures.

Figure 2:
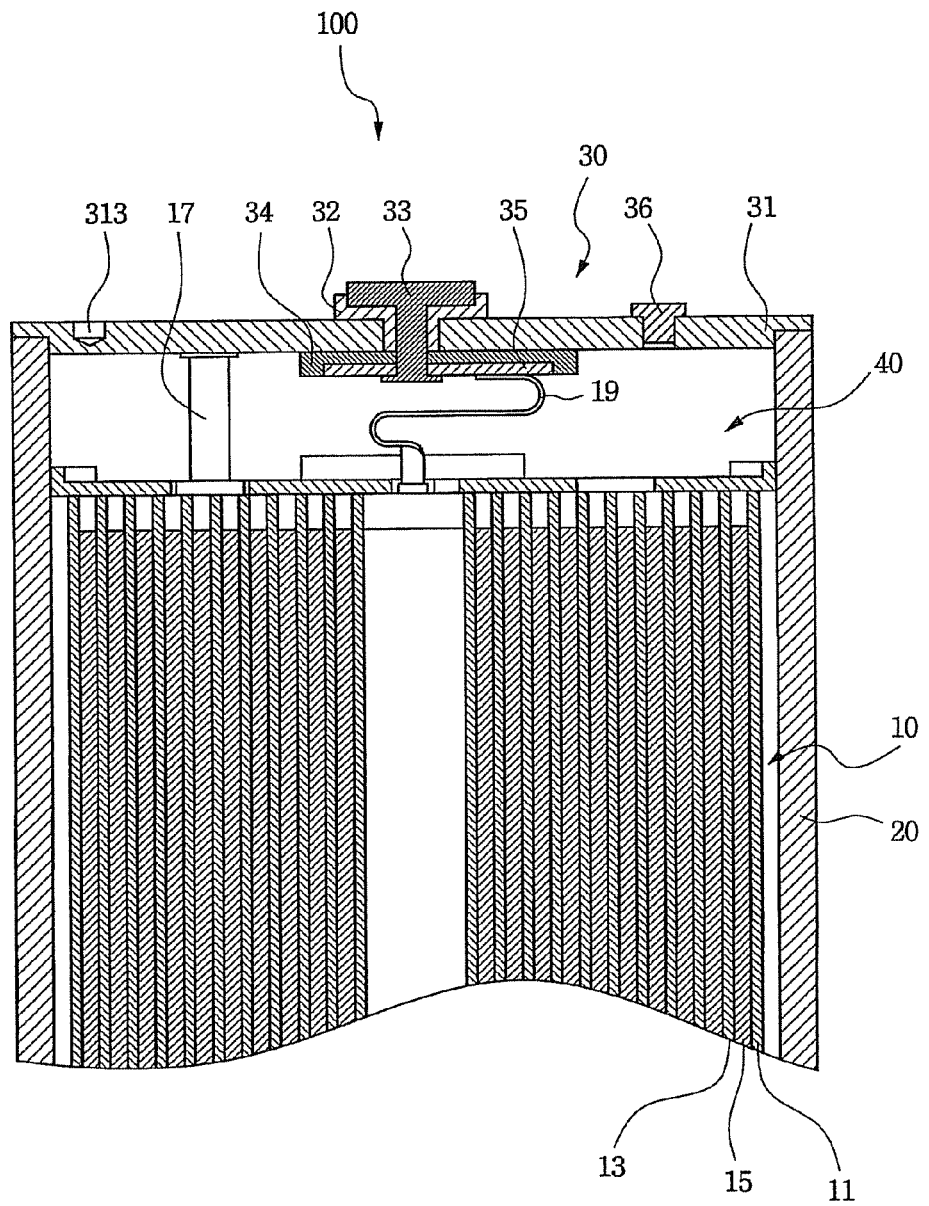
FIG. 2 is an assembled cross-sectional view of the secondary battery of FIG. 1.

FIG. 1 is an exploded perspective view of a secondary battery 100, according to an exemplary embodiment of the present invention, and FIG. 2 is an assembled cross-sectional view of the secondary battery 100. Referring to FIGS. 1 and 2, the secondary battery 100 includes an electrode assembly 10, a can 20 to house the electrode assembly 10, and a cap assembly 30 to seal an opening of the can 20.

Moreover, the secondary battery 100 includes an insulating case 40 located between the electrode assembly 10 and the cap assembly 30. The electrode assembly 10 includes a first electrode plate 11, a second electrode plate 13, and a separator 15 interposed between the first electrode plate 11 and the second electrode plate 13. The first electrode plate 11, the second electrode plate 13, and the separator 15 are stacked and wound, into a jellyroll-type shape.

For convenience, he first electrode plate 11 will be referred to as a positive electrode plate, and the second electrode plate 13 will be referred to as a negative electrode plate. Of course, the polarities of the first electrode plate 11 and the second electrode plate 13 may be reversed, according to the manufacturing process of the electrode plates.

The positive electrode plate 11 is formed by applying a positive electrode active material to a positive electrode collector, which is formed of aluminum or the like. The positive electrode plate 11 includes a positive electrode non-coating portion, to which the positive electrode active material is not applied. The negative electrode plate 13 is formed by applying a negative electrode active material to a negative electrode collector, which is formed of copper or the like. The negative electrode plate 13 includes a negative electrode non-coating portion, to which the negative electrode active material is not applied.

The separator 15 is interposed between the positive electrode plate 11 and the negative electrode plate 13, to prevent a short circuit between the electrode plates 11 and 13. Moreover, the separator 15 has a porous membrane structure, which is permeable to lithium ions.

The electrode assembly 10 further includes a first electrode tab 17 that is conductively attached to the positive electrode non-coating portion, and a second electrode tab 19 that is conductively attached to the negative electrode non-coating portion. Accordingly, the first electrode tab 17 has the same polarity as the first electrode plate 11, and the second electrode tab 19 has the same polarity as the second electrode plate 13. Therefore, in this exemplary embodiment, the first electrode tab 17 is referred to as a positive electrode tab, and the second electrode tab 19 is referred to as a negative electrode tab.

The first electrode tab 17 is electrically connected to a cap plate 31 of the cap assembly 30, and the second electrode tab 19 is electrically connected to an electrode terminal 33 of the cap assembly 30. The positive electrode tab 17 and the negative electrode tab 19 may be formed of nickel and may be attached to the positive electrode non-coating portion and the negative electrode non-coating portion, respectively, by ultrasonic welding or laser welding. However, the present invention is not so limited.

The separator 15 may be formed of thermoplastic resin, such as a polyethylene (PE), a polypropylene (PP), or the like. The separator 15 may melt and/or harden to form an insulating film, when the internal temperature of the battery is higher than the melting point of the thermoplastic resin. Such an insulating film is not permeable to lithium ions, prevents current from flowing between the positive electrode plate 11 and the negative electrode plate 13, and thus prevents any further increase in the internal temperature of the battery.

The can 20 may be prismatic or ovoid, and may have rounded corners. Moreover, the can 20 may be formed of a metal, such as aluminum, an aluminum alloy, or stainless steel. The can 20 may operate as an electrode terminal. The electrode assembly 10, the electrolyte, and the insulating case 40 are all housed in the can 20.

The cap assembly 30 is coupled to the opening of the can 20, to seal the can 20. The cap assembly 30 includes the cap plate 31, an insulating gasket 32, the electrode terminal 33, an insulating plate 34, a terminal plate 35, and an electrolyte injection hole stopper 36.

The cap plate 31 is coupled to the opening of the can 20, to seal the opening of the can 20, and includes a terminal through-hole 311, into which the insulating gasket 32 and the electrode terminal 33 are inserted. Moreover, the cap plate 31 includes an electrolyte injection hole 312, through which the electrolyte is injected into the can 20. The electrolyte injection hole stopper 36 seals the electrolyte injection hole 312. Furthermore, the cap plate 31 may include a vent 313, which is broken to discharge gas, when the internal pressure of the battery reaches a certain level. The vent 313 may include a notch to facilitate breaking.

The positive electrode tab 17 is electrically connected to the bottom surface of the cap plate 31, such that the cap plate 31 serves as a positive terminal. The insulating gasket 32 is connected to the terminal through-hole 311. The insulating gasket 32 is formed of an insulating material, to insulate the electrode terminal 33 and the cap plate 31. The insulating gasket 32 includes a hole formed in the center thereof, to accommodate the insertion of the electrode terminal 33.

The electrode terminal 33 extends through the hole formed in the insulating gasket 32 and is connected to the cap plate 31. The electrode terminal 33 extends through the cap plate 31 and is electrically connected to the terminal plate 35.

The insulating plate 34 is located on the bottom surface of the cap plate 31, insulates the outer surface of the terminal plate 35, and includes a hole through which the electrode terminal 33 passes. The terminal plate 35 is located on the bottom surface of the insulating plate 34. The terminal plate 35 is formed of a conductive material, to form an electrical path when it is connected to the electrode terminal 33. The terminal plate 35 includes a hole through which the electrode terminal 33 passes.

The negative electrode tab 19 is electrically connected to the bottom surface of the terminal plate 35. The electrode terminal 33 serves as a negative terminal.

The insulating case 40 is disposed on the top of the electrode assembly 10, to secure the electrode assembly 10, and to prevent a short circuit between the electrode assembly 10 and the cap assembly 30. The insulating case 40 may include a flat main body 41 and at least one support 42 that extends from an edge of the main body 41, toward the cap assembly 30.

The insulating case 40 may include a tab groove 43 and a tab hole 44, which are formed in the main body 41, and through which the positive electrode tab 17 and the negative electrode tab 19 respectively extend. The insulating case 40 prevents a short circuit between the positive electrode tab 17 and the negative electrode tab 19. The tab groove 43 and the tab hole 44 also guide the insertion of the positive electrode tab 17 and the negative electrode tab 19 through the insulating case 40.

An electrolyte injection hole 45 is formed in the main body 41, to provide a passage through which the electrolyte flows to the electrode assembly 10. The insulating case 40 may be referred to as having a first portion that faces the electrode assembly 10, and a second portion that faces the cap assembly 30. However, the terms "first" and "second" are used for convenience, and are not intended to be limited to any particular orientation/position. The first portion of the insulating case 40, and/or the entire insulating case 40 has a melting point that is substantially the same as the temperature at which the separator 15 contracts (contraction temperature).

In more detail, at least the first portion of the insulating case 40 may be formed of a first material that has a melting point that is substantially the same as the contraction temperature. The second portion of the insulating case 40 may be formed of a second material that is different from the first material, or may be formed of the first material.

According to some aspects, the first portion includes the main body 41, which is formed of the first material, and the second portion includes the support 42, which is formed of the second material. According to other aspects, the main body 41 may be formed of a layer of the first material (not shown), which faces the electrode assembly 10, and a layer of the second material (not shown), which faces the cap assembly 30.

The first material may have a melting point that is lower than that of the second material. In this case, the first material may be a low density polyethylene (LDPE), a linear low density polyethylene (LLDPE), or the like. The second material may be a polypropylene (PP), a polyethylene terephthalate (PET), or the like. However, the present invention is not so limited.

According to some aspects, the first portion and the second portion are both formed of the first material. However, the present invention is not so limited. In such a case, the first portion and the second portion of the insulating case 40 may be integrally formed, and therefore, the entire insulating case 40 has a melting point that is substantially the same as the contraction temperature of the separator 15.

Thus, even if the separator 15 contracts, the insulating case 40, or a portion thereof, melts and flows into the electrode assembly 10. Therefore, the melted material is introduced into a space vacated by the contraction of the separator 15, to prevent a short circuit between the positive electrode plate 11 and the negative electrode plate 13.

If the insulating case 40 melts faster than the separator 15 contracts, the melted material of the insulating case 40 covers the active materials, and reduces the reaction area, thereby reducing the capacity of the battery. If the insulating case 40 melts after the separator 15 contracts, it may be impossible to prevent a short circuit between the positive electrode plate 11 and the negative electrode plate 13. Therefore, the melting point of at least the first portion of the insulating case 40 is generally set to be from about 90% to 110% of the contraction temperature of the separator 15. In particular, at least a portion of the insulating case 40 has a melting temperature of from about 95% to 105% of the contraction temperature.

Generally, if the internal temperature of the secondary battery 100 reaches from about 110° C. to 130° C., the upper end of the separator 15 contracts, and thus, the melting point of at least the first portion of the insulating case 40 may be from about 100° C. to 145° C., or more, and more specifically from about 105° C. to 135° C. Of course, the materials and/or the melting point of the insulating case 40 may be changed, according to the properties of the secondary battery 100 and/or the separator 15.

As described above, according to aspects of the present invention, because the insulating case 40 melts and is introduced into the space formed by the contraction of the separator 15 contracts, it is possible to prevent an electrical short circuit, thus improving safety at high temperature.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An insulating case for a secondary battery that includes an electrode assembly, a can to house the electrode assembly, and a cap assembly to seal an opening of the can, the insulating case comprising:
    a first portion that is a flat main body formed of a first material having a first melting point; and
    a second portion that is at least one support contacting and extending from an edge of the main body, the at least one support being formed of a second material contacting the first material and having a second melting point that is higher than the first melting point.

2. The insulating case of claim 1, wherein:
    the first material is a low density polyethylene (LDPE) or a linear low density polyethylene (LLDPE); and
    the second material is a polypropylene (PP) or a polyethylene terephthalate (PET).

3. The insulating case of claim 1, wherein the first melting point is from about 90% to 110% of a contraction temperature of a separator of the electrode assembly.

4. The insulating case of claim 3, wherein the first melting point of the first material is from about 95% to 105% of the contraction temperature of the separator.

5. The insulating case of claim 3, wherein the first melting point is from about 100° C. to 145° C.

6. The insulating case of claim 4, wherein the first melting point is from about 105° C. to 135° C.

7. A secondary battery comprising:
    an electrode assembly comprising a first electrode plate, a second electrode plate, and a separator interposed between the first electrode plate and the second electrode plate, the separator having a contraction temperature;
    a can to house the electrode assembly;
    a cap assembly to seal an opening of the can; and
    an insulating case disposed between the electrode assembly and the cap assembly, the insulating case comprising a first portion that faces the electrode assembly and is formed of a first material, and a second portion that faces the cap assembly and is formed of a second material contacting the first material, the second material being a polypropylene (PP) or a polyethylene terephthalate (PET),
    wherein the first material has a first melting point that is substantially the same as the contraction temperature of the separator.

8. The secondary battery of claim 7, wherein the first melting point is from about 95% to 105% of the contraction temperature of the separator.

9. The secondary battery of claim 7, wherein the first melting point is from about 100° C. to 145° C.

10. The secondary battery of claim 8, wherein the first melting point is from about 105° C. to 135° C.

11. The secondary battery of claim 7, wherein:
    the insulating case comprises a flat main body;
    the first portion comprises a first surface of the main body; and
    the second portion comprises an opposing second surface of the main body.

12. The secondary battery of claim 7, wherein:
    the insulating case comprises a flat main body; and
    the second portion comprises a support that extends from edge of the main body, toward the cap assembly.

13. The secondary battery of claim 7, wherein the first portion and the second portion are formed of different materials.

14. The secondary battery of claim 13, wherein the second portion has a second melting point that is higher than the first melting point.

15. The secondary battery of claim 14, wherein the first material is a low density polyethylene (LDPE) or a linear low density polyethylene (LLDPE).

16. A. secondary battery comprising:
    an electrode assembly comprising a first electrode plate, a second electrode plate, and a separator interposed between the first electrode plate and the second electrode plate, the separator having a contraction temperature;
    a can to house the electrode assembly;
    a cap assembly to seal an opening of the can; and
    an insulating case disposed between the electrode assembly and the cap assembly, the insulating case comprising a first portion that faces the electrode assembly and is formed of a first material having a first melting point that is substantially the same as the contraction temperature of the separator, and a second portion that faces the cap assembly and is formed of a second material contacting the first material, the second material having a second melting point that is higher than the first melting point.

17. The secondary battery of claim 16, wherein:
the insulating case comprises a flat main body;
the first portion comprises a first surface of the main body; and
the second portion comprises an opposing second surface of the main body.

18. The secondary battery of claim 16, wherein:
the first portion comprises a flat main body; and
the second portion comprises a support that extends from an edge of the main body, toward the cap assembly.

19. The secondary battery of claim 16, wherein the first material is a low density polyethylene (LDPE) or a linear low density polyethylene (LLDPE), and the second material is a polypropylene (PP) or a polyethylene terephthalate (PET).

20. The secondary battery of claim 16, wherein the first melting point is from about 90% to 110% of the contraction temperature of the separator.

21. The secondary battery of claim 20, wherein the first melting point is from about 95% to 105% of the contraction temperature of the separator.

22. The secondary battery of claim 20, wherein the first melting point is from about 100° C. to 145° C.

23. The secondary battery of claim 21, wherein the first melting point is from about 105° C. to 135° C.

* * * * *

UNITED STATES PATENT AND TRADEMARK OFFICE
CERTIFICATE OF CORRECTION

| | | |
|---|---|---|
| PATENT NO. | : 8,530,077 B2 | Page 1 of 1 |
| APPLICATION NO. | : 12/617907 | |
| DATED | : September 10, 2013 | |
| INVENTOR(S) | : Chang-Bum Ahn et al. | |

It is certified that error appears in the above-identified patent and that said Letters Patent is hereby corrected as shown below:

In the Claims

Column 6, Claim 12, lines 45-46       After "from"

Insert -- an --

Signed and Sealed this
Sixteenth Day of June, 2015

Michelle K. Lee
*Director of the United States Patent and Trademark Office*